United States Patent [19]

Yamada

[11] Patent Number: 5,117,431
[45] Date of Patent: May 26, 1992

[54] SYNCHROTRON RADIATION EXCITED LASER

[75] Inventor: Hironari Yamada, Tanashi, Japan

[73] Assignee: Sumitomo Heavy Industries, Ltd., Tokyo, Japan

[21] Appl. No.: 655,376

[22] PCT Filed: Jul. 12, 1990

[86] PCT No.: PCT/JP90/00899
§ 371 Date: Mar. 6, 1991
§ 102(e) Date: Mar. 6, 1991

[87] PCT Pub. No.: WO91/01054
PCT Pub. Date: Jan. 24, 1991

[30] Foreign Application Priority Data

Jul. 13, 1989 [JP] Japan .................. 1-181540

[51] Int. Cl.⁵ .............................. H01S 3/00
[52] U.S. Cl. ............................ 372/2; 372/6; 372/74; 372/94
[58] Field of Search ............... 372/2, 6, 70, 73, 74, 372/94; 315/5.42

[56] References Cited

U.S. PATENT DOCUMENTS

| 3,982,200 | 9/1976 | Hoag et al. | 372/73 |
| 4,482,843 | 11/1984 | Perring | 372/2 |
| 4,961,201 | 10/1990 | Opower | 372/94 |

FOREIGN PATENT DOCUMENTS 61-164281 7/1986 Japan .

Primary Examiner—William L. Sikes
Assistant Examiner—Robert E. Wise
Attorney, Agent, or Firm—Frishauf, Holtz, Goodman & Woodward

[57] ABSTRACT

A laser device disposed around an electron orbit in a SR device, for being excited by SR lights and emitting stimulated emission of radiation. A synchrotron radiation excited laser device comprising a synchrotron radiation device generating synchrotron radiation in the plane including an electron orbit, and a laser medium member formed of a material capable of being excited by synchrotron radiation to a state capable of emitting light, which can form a new light source utilizing SR radiation which has been thrown away in vain in the SR device.

6 Claims, 4 Drawing Sheets

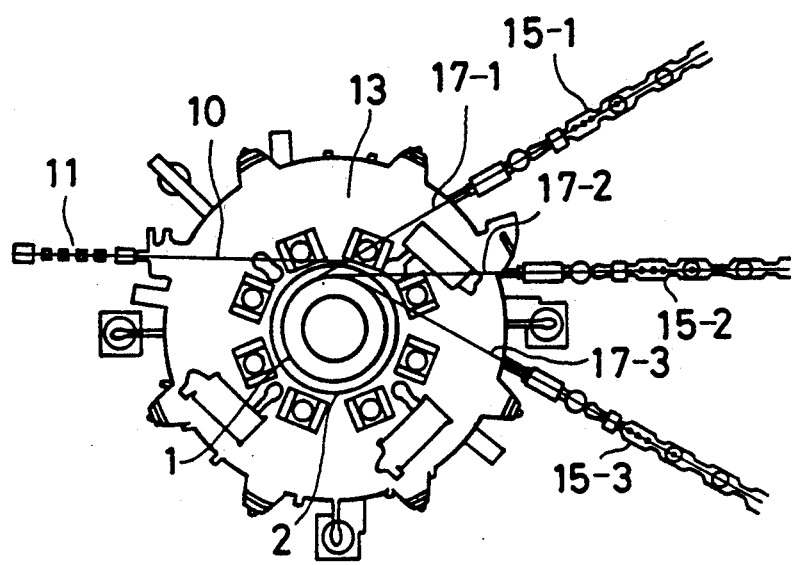
Fig.2A
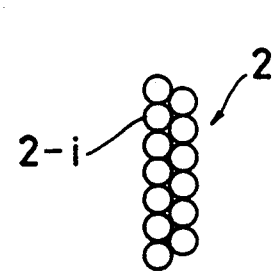 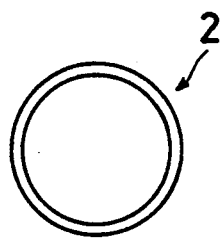 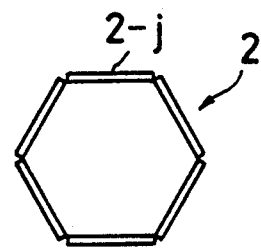
Fig.2B  Fig.2C  Fig.2D

SYNCHROTRON RADIATION EXCITED LASER

TECHNICAL FIELD

This invention relates to a laser device, and more particularly to a laser device in which a laser medium is excited by lights. Also, from another point of view, this invention relates to a synchrotron radiation (SR) utilizing device.

BACKGROUND OF ART

As laser devices, there are known those utilizing solids as the laser medium such as glass laser, semiconductor laser and those utilizing gases as the laser medium such as He-Ne laser, Ar laser, $CO_2$ laser. In these lasers, the laser medium capable of emitting lights is excited by sole use exciting means such as high frequency electric power, current conduction, electric discharge, to generate laser lights.

Recently, synchrotron radiation (SR) devices have been attracting attention as short wavelength light sources. Electrons accelerated nearly to the light velocity are stored in a predetermined orbit, and SR lights generated in the tangential directions when electrons are bent by magnetic field, etc. are derived out as light outputs. The SR lights are generated in a continuous spectrum in a wide wavelength range.

SR light utilizing devices are set around the electron orbit through light beam lines which are disposed in the tangential directions of the orbit.

For example, tens of SR light utilizing devices can be disposed around a circular or elliptic electron orbit.

As is described above, sole use exciting means is provided in the conventional laser device for exciting laser medium. Also, in the conventional SR device, most of the SR lights which are not utilized are dissipated by impinging on the inner wall.

DISCLOSURE OF INVENTION

An object of this invention is to provide a synchrotron radiation excited laser capable of improving utilization efficiency of SR lights.

Another object of this invention is to provide a laser device of various wavelengths.

In a synchrotron radiation device, there are many lights which are not utilized and abandoned. By exciting a laser medium by these synchrotron radiation lights, a laser light can be taken out from the laser medium.

Referring to FIG. 1A, an electron orbit 1 is set in a synchrotron radiation device. A laser medium is disposed outside of the electron orbital 1. The electron orbit 1 and the laser medium 2 are disposed on the same plane.

SR lights generated from electrons moving in the electron orbit proceed in the tangential direction of the electron orbit 1, and irradiate the laser medium 2 which is disposed on the same plane as and outside of the electron orbit. The laser medium 2 irradiated by the SR lights is driven to an excited state and become light emissive. Here, when a stimulating light is introduced into the laser medium 2, stimulated emission occurs to generate a laser light.

By utilizing SR light which are usually thrown away in vain, to excite a laser medium, SR lights can be effectively utilized to obtain a laser light.

By utilizing SR lights, which form continuous wavelength light source, as an exciting source, monochromatic lights can be derived from various media.

Also, it become possible to use a laser medium which can not have been utilized by the lack of appropriate exciting means.

BRIEF DESCRIPTION OF THE DRAWINGS

FIGS. 1A, 1B and 1C show basic embodiments of this invention, wherein FIG. 1A is a plane view showing a plan structure, FIG. 1B is a cross section showing a fiber structure for the use of a solid medium, and FIG. 1C is a cross section showing a gas vessel structure for the use of a gas medium;

FIGS. 2A, 2B, 2C, and 2D show SR light excited laser devices according to embodiments of this invention, wherein FIG. 2A is a plan view showing a schematic plan structure, FIG. 2B is a cross section showing a structure of a fiber bundle, FIG. 2C schematically shows circular configuration of the laser medium and FIG. 2D schematic shows linear type configuration of the laser medium;

EMBODIMENTS

Figure 1A:
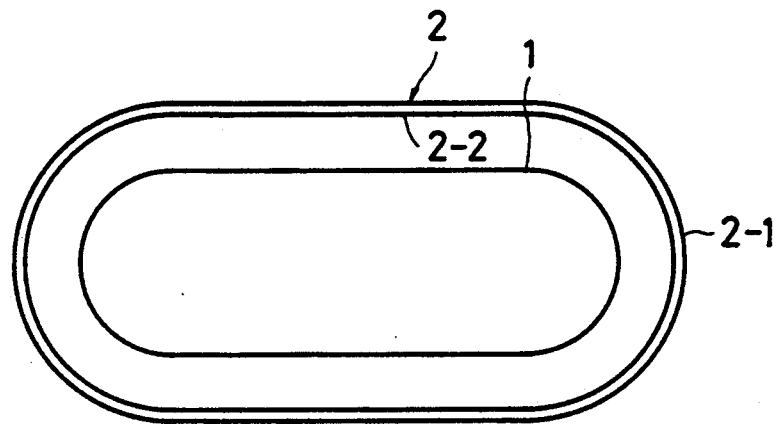
Figure 1B:
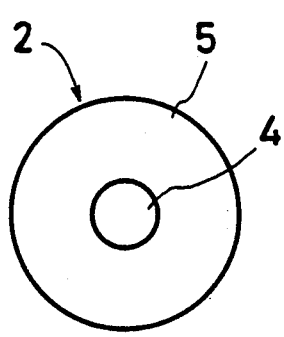
Figure 1C:
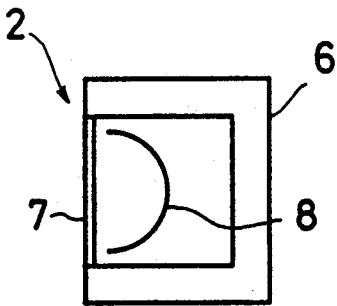

FIGS. 1A, 1B and 1C show basic embodiments of this invention.

FIG. 1A is a plan view showing a basic configuration of an electron orbit 1 and a laser medium 2. In the figure, a race track type orbit is shown. It may also be employed circular orbit. Also, it may have a annular shape. SR lights generated by electrons moving in the electron orbit 1 proceed outwardly in the plane defined by the electron orbit. Thus, the laser medium 2 preferably has a thin tuber structure. The laser medium is a solid, liquid or gas. Hereinafter gas and liquid will be called fluid. A solid medium is typically formed into a fiber structure as shown in FIG. 1B. In the fiber shown in FIG. 1B, a core 4 formed of a laser medium is enclosed with a clad 5 for encapsulating lights. It is not always necessary to have the clad 5 all over the core 4. For example, such a structure may be employed in which the core 4 is directly exposed in the portion facing the electron orbit. A long fiber having such a cross sectional structure is disposed outside the electron orbit 1. Since the fiber has a function of encapsulating and guiding lights, it may be disposed while being curved. When the fiber is disposed in a loop shape as shown in FIG. 1A, it is possible to encapsulate lights.

When the laser medium is a fluid, the fluid is contained in a vessel as shown in FIG. 1C. For example, a vessel 6 is disposed outside the electron orbit 1 in a configuration of the race track type laser medium shown in FIG. 1A. On the inner side of the vessel 6, a window 7 capable of transmitting SR lights is provided. As the material for the window, quartz glass is appropriate in the case of using visible lights as exciting lights, and a beryllium Be thin film of a thickness of the order of 1 $\mu$m is convenient in the case of using soft X rays. Further, a semi-cylindrical mirror 8 is disposed in the vessel. The inner surface of the cylinder is formed into a mirror surface, to reflect the incident light to the central axial portion and to reflect light propagating in the axial direction perpendicular to the plane of sheet to proceed in a predetermined race track shape. A gas is filled in this vessel 6 and the vessel 6 is disposed outside the electron orbit 1. The gas is excited by the SR incident lights to generate light emission. In the gas, the lights are guided by the mirror 8 and proceed in the longitudinal direction of gas vessel to cause stimulated emission. When the gas medium is disposed in a loop shape, a loop shaped light path is formed.

As the laser medium, such solids as glasses, and such gases as Ar, He-Ne, $CO_2$ which are both used in the conventional lasers can be used. Further, various other materials can also be used, as will be described latter.

Here, SR lights are used for exciting a laser medium. The SR lights have a continuous spectrum. Therefore, it is free to choose a wavelength therefrom. Here however, for transporting the light emitted from the electron orbit to the laser medium, there should not be any member on the way of light passage, which disturbs or absorbs the light. Therefore, the clad 5 in the case of the fiber structure, and the window 7 of the gas vessel are formed of materials which are transparent to the lights of an aimed wavelength. Although SR light has a continuous spectrum, the utilization value of the light is particularly high for those lights of ultra violet region, extreme ultra violet region and soft X ray region. It becomes possible to utilize a laser medium or transition between quantum levels which can be excited only through the use of light of these wavelengths. For example, such materials may be $BaF_2$, $CaF_2(Eu)$, etc.

FIGS. 2A, 2B, 2C and 2D show SR light excited laser devices according to embodiment of this invention.

FIG. 2A shows a schematic plan structure. Accelerated electrons are injected through an electron injecting system 11 into a storage ring 13. These injected electrons 10 are accelerated nearly to the light velocity. These electrons 10 are bent in a magnetic field established by super conducting magnets disposed above and below the storage ring 13 and are stored in a circular orbit 1 shown by a circle. Lights are always generated from the electron moving on a circular orbit in the tangential directions. Three SR light deriving systems 15 for deriving such light are shown on the right side in the figure. Namely, SR light 17-$i$ emitted from the electron orbit 1 are injected into the SR light deriving system 15-$i$. Here, the laser medium 2 is disposed outside of the electron orbit 1.

This laser medium may be an assembly of fibers 2-$i$ put in a bundle shape, as shown in FIG. 2B. These fibers may be formed all of the same material, or may be formed of different materials in the inside part and in the outside part. Further, each of the fiber 2-$i$ may comprise a core and a clad. Alternatively, fibers 2-$i$ may only be formed of cores and a clad layer surrounding all these cores may be provided. For example, the core may be formed of glass doped with Er to derive a laser light of a wavelength 1.55 μm. The clad may be formed of glass doped with fluorine similar to those used in ordinary fibers. Cores may also be formed of glass doped with $Ne^{3+}$ which is a usual glass laser material. Regarding these materials, reference may be made to M. Shigematsu "Microoptics News" Vol. 8, No. 1, February 1990, which is incorporated herein by reference.

The laser medium 2 may be disposed circularly surrounding the electron orbit as shown in FIG. 2C or may be disposed in a polygonal shape comprising a plurality of linear portions 2-$j$ as shown in FIG. 2D. Also, the laser medium may be divided into several parts disposed separately. When the laser medium is constructed by a plurality of linear portions as shown FIG. 2D, each portion 2-$j$ may constitute a laser resonator, or loop shaped laser resonator may be formed by combining the portions 2-$j$ with reflecting mirrors. In this way, when a plate shaped or a rod shaped laser medium or a media are used, the basic concept are the same with the usual solid laser or liquid laser, except the exciting means.

Figure 3:
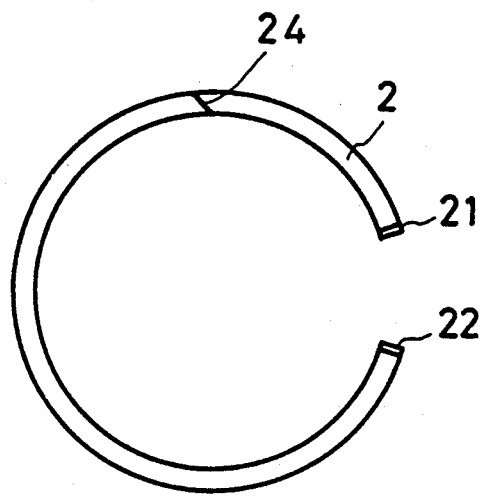
FIG. 3 is a schematic plan view showing a laser resonator formed of a fiber.

FIG. 3 shows a structure which forms a laser resonator with substantially circularly configured fiber except a portion. A pair of reflecting mirrors 21 and 22 are disposed at the both ends of the fiber 2. For example, the light propergating in the fiber 2 and reflected by the reflecting mirror 21 proceeds again through the fiber 2, follows the circular orbit, and reach the other reflecting mirror 22. Here, the light is again reflected and proceeds in the reverse direction in the fiber 2. In this way, laser oscillation is enhanced by the light going to-and-fro in the fiber 2. For deriving an output laser light, one of the reflecting mirrors 21 and 22 may be formed of a half mirror having a desired reflection coefficient, or of a Q switch. Also, a half mirror or Q switch 24 may be disposed at an intermediate position in the fiber. For example, an electron-optical Q switch may be formed by utilizing KDP crystal, etc. When a Q switch is inserted in an intermediate position of the fiber, it may be preferable to insert a crystal of prism shape to increase the Q value to derive the light.

Figure 4:
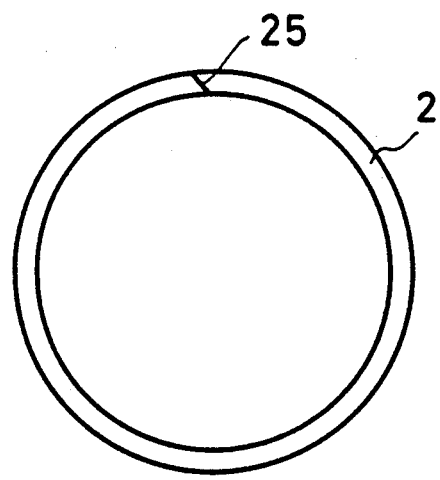
FIG. 4 schematically shows a laser device formed of a loop shaped circular fiber.

Also, the both ends of the fiber 2 may be connected to form a shape of a perfect loop as shown in FIG. 4. The derivation of an output light may be done by providing a half mirror or a Q switch 25 in the fiber.

Figure 5:
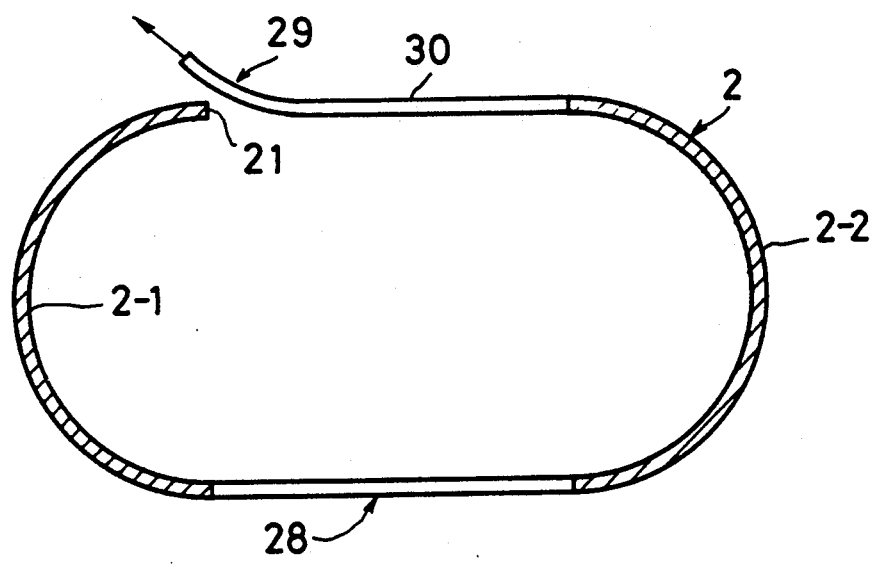
FIG. 5 schematically shows a travelling wave laser formed of a light path having an open end.

Also, it is possible to constitute the laser without forming resonator. FIG. 5 shows a laser of traveling wave type. At one end of a fiber 2-1 of the laser medium, a reflecting mirror 21 is mounted. The other end of the fiber 2-1 is coupled to a fiber 2-2 of another laser medium through a light conducting path 28. Another end of this laser medium 2-2 is connected to a light waveguide path 30 having a light deriving open end 29. The light propagating from the light deriving open end 29 toward the reflecting mirror 21 is reflected by the reflecting mirror 21 and passes through the laser media 2-1 and 2-2 again. At this time, the laser media 2-1 and 2-2 causes stimulated emission and form stimulated emission of radiation having a gradually increasing intensity. This stimulated emission of radiation is derived from the open end 29 of the light waveguide path 30.

Figure 6:
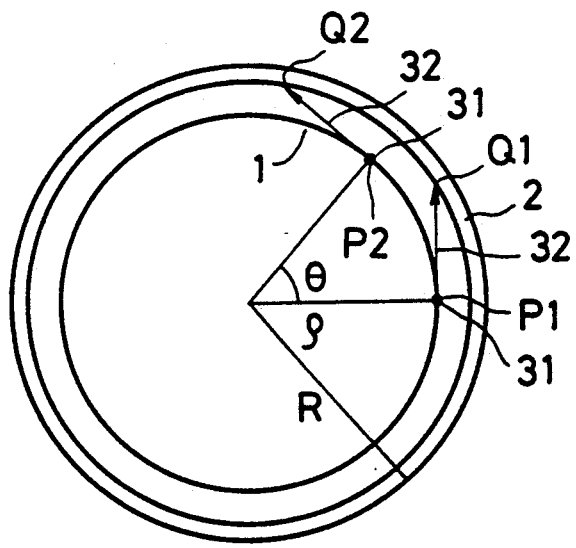
FIG. 6 schematically illustrates laser generating mechanism in the case of a circular electron orbit and a circular laser medium.

Description will further be made on the case where the laser medium 2 is a fiber disposed in a circular loop shape, referring to FIG. 6. Let us suppose here that the electron orbit 1 is also circular. When relativistic electrons 31 are bent by a magnetic field, etc. to move in a perfectly circular orbit 1, SR lights 32 are generated in the tangential directions. These SR lights 32 impinge on the laser medium 2 in the fiber. Atoms in the laser medium are excited by the SR lights 32. When these excited atoms make transitions to the lower quantum levels again, lights are emitted. The emitted light propagate along the fiber 2. Namely, the SR lights 32 are used to pump up the laser medium 2 and to form an inverted population distribution in the laser medium 2.

Since the fiber 2 is disposed with a certain radius, it is necessary to pay attention for constructing a Fabry- Perot resonator. When the laser light is reflected at the wall surface of the fiber, and passes various light paths, it is not easy to cause interference of a particular light. Therefore, when the laser is to be oscillated in a single mode, the fiber is preferably made as thin as possible to construct waveguide type resonator. The radius and the refractive index of the fiber are determined on the bases of output frequency. Also, in the case of a structure where a pair of reflecting mirrors are provided at the both ends of a fiber as shown in FIG. 3, the total length of the fiber is related with the laser wavelength. For controlling the laser oscillation and its stability, techniques of ordinary laser oscillation can be used. For example, reference may be made to "Laser Handbook" edited by Laser Academy and published by Ohm Inc. For example, the oscillating condition can easily be altered by the use of an etalon plate.

Usually, the SR lights from a storage ring is emitted periodically. This is due to the fact that electrons form a bunch or bunches and move on the electron orbit. Thus, when seeing at one position, the generated SR light are emitted periodically. The period of SR light emission is of the order of tens nano-seconds in the case of small size SR ring and of the order of micro-seconds in the case of large size SR ring. In the small size SR device (called Aurora) developed by the present applicant or assignee, two bunches of electrons move, and the period of light emission can be made of the order of 5 nano-seconds. Therefore, as the laser medium to be used, such materials which has decay constant of the related energy levels as short as such value can be selected. For example, when the period of SR light emission is 5 nano-seconds, it is possible to employ the decay constant as short as about 5 nano-seconds. It will be possible to use crystals of alkaline earth helides such as $BaF_2$ and alkaline halides such as CsF and RbF. Regarding these general knowledges, reference may be made for example to articles by Minoru Ito in "Synchrotron Radiation" Volume 2, No. 3.

Description will further be made in more detail referring to FIG. 6. The SR light emitted from an electron at the point P1 is directed in its tangential direction and excites the laser medium at the point Q1 on the laser medium. The electron bunch proceeds on the electron orbit and emit another SR light at the point P2, this SR light proceeds on the tangent of the electron orbit and excites the laser medium at the point Q2 on the laser medium. Let the radius of the electron orbit be $\rho$, and the angle of movement of the electron be $\theta$, the time required for an electron to move from P1 to P2 is $\rho\theta/v$. Here, v is the velocity of an electron, and is approximately equal to the light velocity $v \approx c$.

On the other hand, if the radius of the laser medium 2 is R, it will take a time $R\theta n/c$ for the light emitted at the point Q1 to reach the point Q2. Here, c/n represents the velocity of light in the laser medium. It always holds $R > \rho$, if the laser light proceeds in the same direction as the moving direction of the electron, it is possible to create a circumstance that an inverted population distribution formed by excited medium always exists in front of the propagation of the laser light. Therefore, when constructing a traveling wave type laser, such medium which has levels of considerably short lifetime can be used. For example, it will be possible to use alkaline halide such as CsF (lifetime 2.9 nsec), CsCl (lifetime 0.80 nsec) and CsBr (lifetime 0.07 nsec).

When constructing a laser of standing wave type, the laser light may proceed in the same direction or in the opposite direction as the propagation of the electron. In this case, the laser light meets the inverted population distribution which has been made by the light emitted from the electrons which have previously circulated. Thus, the lifetime of the associated levels is preferably longer than the circulation time of the electrons.

In any case, such laser media which could not be utilized heretofore become possible to be used by utilizing a pulse operated SR light emitting system for the purpose of pumping.

Since the SR light has a very high directivity, it is effective to use a thin fiber. By using a thin fiber, it is easy to enhance the cooling effect.

I claim:

1. A synchrotron radiation excited laser device, comprising:
   a synchrotron radiation unit capable of generating synchrotron radiation in a plane including an electron orbit; and
   a laser medium member disposed in said plane outside of said orbit, and formed of a material which can be excited into a light emissive state by the synchrotron radiation.

2. A synchrotron radiation excited laser device as defined in claim 1, wherein said laser medium member is constructed in a fiber shape.

3. A synchrotron radiation excited laser device as defined in claim 2, wherein said laser medium member of fiber shape includes a bundle of fiber elements.

4. A synchrotron radiation excited laser device as defined in claim 1, further comprising;
   a mirror member disposed outside of said laser medium member and capable of reflecting light.

5. A synchrotron radiation excited laser device as defined in claim 4, wherein said laser medium member is a fluid contained in a vessel having a light transmissive window in an inside wall thereof.

6. A synchrotron radiation excited laser device as defined in claim 1, wherein said laser medium member is formed in a ring shape outside of the electron orbit.

* * * * *